May 11, 1954    G. SZÉKELY ET AL    2,678,044
DEVICE FOR PREPARING INHALATE-MIXTURES
Filed June 9, 1950
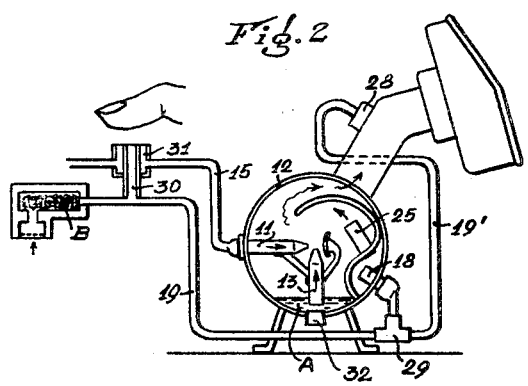
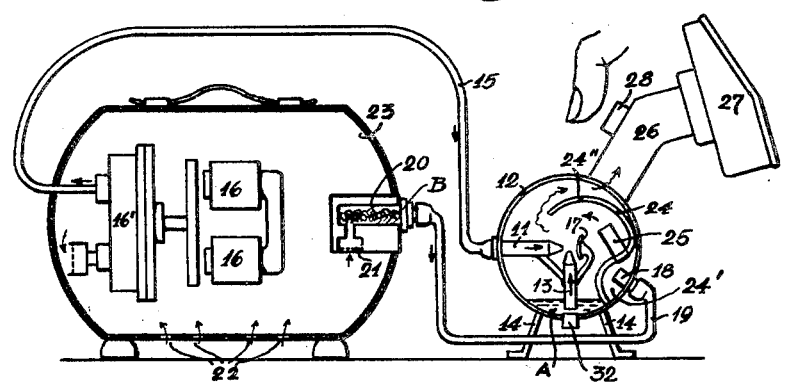
Inventors
George Székely
and David Zerykier
By Dezső Steinberg
Attorney Patented May 11, 1954

2,678,044

UNITED STATES PATENT OFFICE 2,678,044

DEVICE FOR PREPARING INHALATE-MIXTURES

George Székely and David Zerykier, Tel Aviv, Israel

Application June 9, 1950, Serial No. 167,024

2 Claims. (Cl. 128—194)

It is well known with certain diseases, especially with diseases of the respiratory organs, to inhale therapeutical substances transformed by air pressure or heat into a gaseous or nebulous condition. With homogeneous substances the preparation and dispensation of the inhalate encounters no difficulties. But in case it is desired to simultaneously administer two substances, which from any reason, physical or chemical, are not mixable or should not be mixed prior to their being nebulised, this desire could not hitherto be satisfied and the two substances had to be administered separately and successively.

The present invention overcomes this inconvenience by availing itself of the fact that in inhaling, only a part of the inhaled air is taken from the nebuliser or sprayer while the rest of the air needed for the single breath is taken from the atmosphere. The first mentioned air is hereinafter denominated as respiration air and the second air is named the complementary air. Now according to the invention there is provided a mixing receptacle within which the liquid therapeutical substance is nebulised or into which the nebulised substance is introduced and into which also the complementary air enters after having been led over the second substance which is volatile by nature or has been made volatile by a soluble solvent. The complementary air passing over the volatile substance carries with it the fumes of this substance. The respiration air and the pretreated complementary air are led through separate ducts into the mixing receptacle and are simultaneously inhaled. Thus the state of both substances is changed prior to their being inhaled and the complementary air is made a therapeutically contributory factor of the inhalation. The second substance may also act as a disinfectant or otherwise.

The new device is illustrated, by way of example, in Figures 1 and 2, in two similar embodiments equipped with an electromagnetically driven pump for producing compressed air, the pump being omitted in Figure 2.

Referring now to the drawings in detail, the device shown in Figure 1 comprises essentially a nebuliser or sprayer 11, 13. The nebuliser 11, 13 is located within a receptacle 12 preferably made as a translucent horizontal hollow cylinder provided with feet 14 so that it can rest on a table. The air nozzle 11 and spraying nozzle 13 enclose a right angle. Nozzle 11 is connected by a hose 15 to the membrane-pump 16' which is driven by the electromagnet 16 energised by an alternating current. The nozzle 13 is held above the bottom of receptacle 12 its lower end dipping in the filled in liquid A. The liquid leaving the nozzle 13 is sprayed by the air jet leaving the nozzle 11 and thrown against the baffle 17. The air needed for the respiration enters into the receptacle 12 through the small tube 18 communicating through a hose 19 with a tubular chamber 20 accommodating a volatile substance B. Here the air enters the chamber 20 through a filter 21. Pump 16, chamber 20 and filter 21 are enclosed in a preferably transportable housing 23, having in its bottom a few air openings 22. This housing protects the enclosed parts against dust, and the air passing therethrough towards the chamber 20 is partly warmed and dried by the heat produced by the working pump, thus facilitating the evaporation of the volatile substance. A partition wall 24 is erected between the nozzle 11 and baffle 17 on one side and tube 18 on the other side. This wall is bent to form at its lower end an air compartment 24' and at its upper part a screen 24" overhanging the nozzle 11 and the baffle 17. Any drops leaving the spraying nozzle encounter the baffle and are dispersed and then, if yet present, encounter the screen on which they subside and from which they flow down. Only the finest vapor or mist can rise over the screen and no coarse liquid particles reach the respiratory organs. At the middle of wall 24, but staggered with relation to the air inlet 18 there is arranged a separate passage 25 for the air from the chamber 24'; the air from compartment 24' and the air jet from nozzle 11 do not directly collide and a long way is afforded to mixing of both.

The so obtained gaseous mixture passes from the receptacle 12 through the connecting tube 26 into the mask 27. On the tube 26 there is provided an air opening 28 which is to be closed by a finger during the inhalation and is to be kept open during the exhalation. In the bottom of the receptacle there is provided an opening closed by a stopper 32 after the removal of which the receptacle and the nozzle 13 can be easily cleaned.

With the just described embodiment the exhaled air can escape through the opening 28, but some of this air might enter the mixing receptacle 12 and dilute the mixture. Such an occurrence is eliminated by the modification of the device shown in Fig. 2.

According to this modification the air opening 28 communicates through the hose 19' and a T-connection 29 with hose 19 and tube 18. Into hose 19 is inserted a short tube 30 open into the atmosphere and the exhaled air can escape therethrough but can enter the mixing chamber. Tube 30 is concentrically, located in a second tube 31 which is seated in the duct 15 leading to pump 16', so that both tubes 31, 31 can be simultaneously closed by one finger of the user. Thus when tube 30 is open during the exhalation, the air delivered by the pump also escapes through tube 31 and does not reach the nozzle 11 with the result that during the exhalation neither substance A nor substance B are consumed. Hereby the air which is constantly supplied by the pump cannot also counteract to the air exhaled in the reverse direction. During the inhalation both tubes are closed by the finger, whereby the compressed air gets through the nozzle 11 into the mixing receptacle, and the complementary air is sucked through tube 18 into that receptacle. By pressing down and lifting the finger the user is enabled to choose at will the duration of the rhythmic inhalation and exhalation.

What we claim is:

1. Device for preparing inhalate-mixtures comprising a receptacle for a liquid therapeutical substance, a nebuliser within the receptacle, an air compression pump, an air duct connecting the pump with the nebuliser, a compartment for a volatile substance, an air duct leading from the compartment into the receptacle, a mask to be applied to the mouth of the user, and a passage connecting the mask with the receptacle, there being provided a baffle in front of the nebuliser and a bent wall forming within the receptacle an air chamber around the entrance of the air duct coming from the compartment and a screen extending over the nebuliser and the baffle.

2. Device for preparing inhalate-mixtures comprising a receptacle for a liquid therapeutical substance, a nebuliser within the receptacle and an air compression pump operating by means of a membrane oscillated by an electromagnet energised by a high frequency alternating electric current, an air duct connecting the pump with the nebuliser, a compartment for a volatile substance, an air duct leading from the compartment into the receptacle, a mask to be applied to the mouth of the user, a passage connecting the mask with the receptacle, and an opening into the atmosphere on said passage, said device having an additional duct connecting the opening on said passage with the duct coming from said compartment, and two open concentric small tubes, one of which is inserted in the duct coming from the pump and the other is inserted in the duct coming from said compartment.

References Cited in the file of this patent

UNITED STATES PATENTS

| Number | Name | Date |
|---|---|---|
| 391,564 | Stormer | Oct. 23, 1888 |
| 483,435 | Dunlap | Sept. 27, 1892 |
| 582,124 | Grigsby | May 4, 1897 |
| 950,738 | Baker | Mar. 1, 1910 |
| 1,312,117 | Hinkle | Aug. 5, 1919 |
| 1,839,193 | Blanchard | Jan. 5, 1932 |
| 1,853,242 | Sliter | Apr. 12, 1932 |
| 2,040,630 | Silten | May 12, 1936 |
| 2,150,764 | Farineau | Mar. 14, 1939 |
| 2,414,918 | Abramson | Jan. 28, 1947 |
| 2,503,650 | Abramson | Apr. 11, 1950 |

FOREIGN PATENTS

| Number | Country | Date |
|---|---|---|
| 868,171 | France | Sept. 22, 1941 |